June 7, 1938.  O. J. CROWE  2,119,667

CLOSURE FRAME

Filed Oct. 8, 1936

INVENTOR.
Orley J. Crowe.
BY
Harness, Dickey, Pierce & Hann.
ATTORNEYS.

Patented June 7, 1938

2,119,667

UNITED STATES PATENT OFFICE 2,119,667

CLOSURE FRAME

Orley J. Crowe, Detroit, Mich., assignor to Herron-Zimmers Molding Company, Detroit, Mich., a corporation of Illinois Application October 8, 1936, Serial No. 104,657

5 Claims. (Cl. 189—75)

This invention relates to improved closure frames and in particular relates to frames which support screen elements and window sealing elements.

One of the objects of the present invention is to provide an improved frame structure so formed that a screen element and a window sealing element are secured in position therein.

Another object of the invention is to provide an improved frame structure in which the elements forming the structure comprise single sheet metal elements so formed that means are provided for retaining a screen element and a window sealing element therein.

Another object of the invention is to provide an improved closure frame structure which is simple and economical to manufacture.

Other objects of the invention will become apparent from the following specification, the drawing relating thereto and from the claims hereinafter set forth.

In the drawing in which like numerals are used to designate like parts in the several views throughout:

Figure 1:
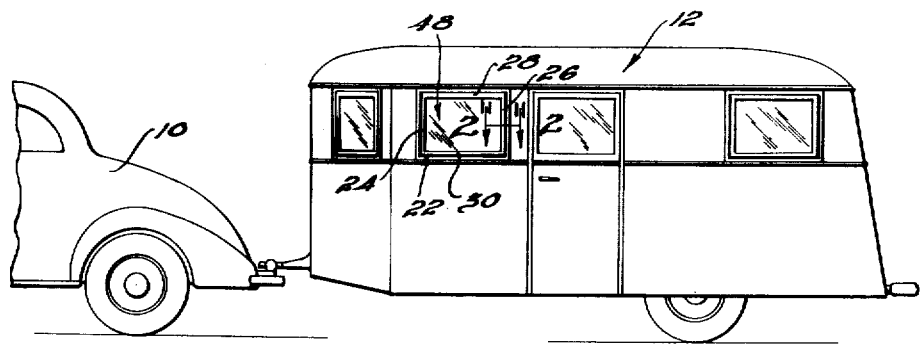
Fig. 1 is a side elevational view of a vehicle and trailer embodying features of the present invention.
Figure 2:
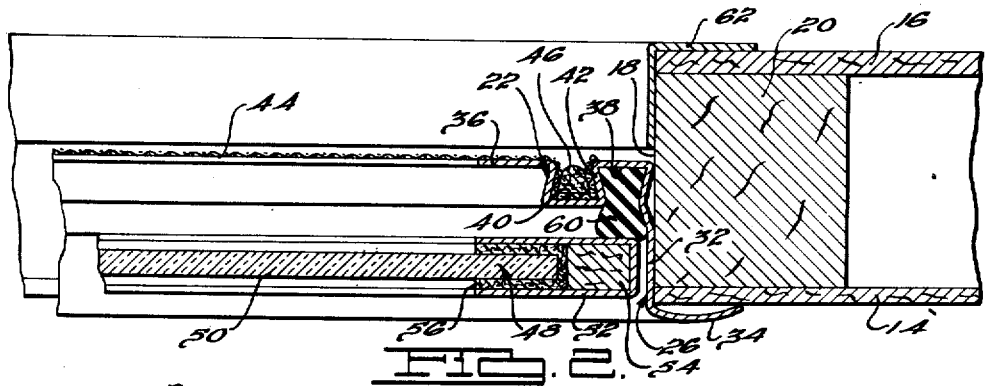
Fig. 2 is an enlarged cross-sectional view taken substantially along the line 2—2 of Fig. 1.
Figure 3:
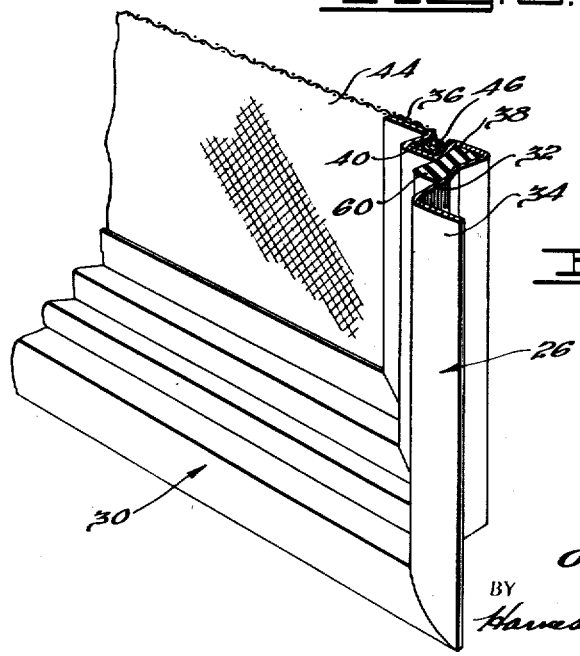
Fig. 3 is a fragmentary perspective view of a closure frame embodying features of the present invention.

For the purpose of illustration an embodiment of the present invention is shown in the drawing in which, in Fig. 1, an automobile 10 is partially illustrated having connected thereto a trailer 12. The trailer body is formed having outer panels 14 and inner panels 16 spaced therefrom with openings 18 therethrough providing window openings. The panels 14 and 16 are connected together adjacent the window openings by members 20 having one edge thereof flush with the edges of the openings 18 to form with the panels 14 and 16 the window openings.

The present invention is directed particularly to the closure frame structures which are mounted within the openings 18 and which cooperate with the windows to enclose the interior of the trailer body. The window openings 18 are preferably substantially rectangular in shape and a frame structure generally indicated at 22 is given a complementary shape and fits snugly within the window openings.

The frame structure 22 comprises side elements 24 and 26, top element 28 and bottom element 30, the elements being joined together at their ends to form the frame outline. Each element is substantially identical to the others and a detailed description of one will suffice for all.

The element 26, forming a side of the window frame structure, preferably is formed from a single sheet metal member having a substantially straight body portion 32 which is bent outwardly adjacent its outer edge to form a curved flange 34. The remaining portion of the sheet metal member is bent inwardly substantially normal to the straight portion 32 to form an inwardly directed flange portion 36 extending in a direction opposite to that of the flange portion 34. The flange portion 36 is bent to form oppositely facing channels 38 and 40, the channel 38 opening outwardly and the channel 40 opening inwardly. For a simplified construction the channels 38 and 40 have one common wall 42 and the walls of each of the channels converge toward the channel openings for a purpose to be described hereinafter.

The ends of each of the frame elements are formed with an angle of 45° so that each of the elements may be joined at right angles with its adjacent element, providing a frame outline having an opening therethrough. A screen 44 is stretched over the frame structure covering the opening, the edges of the screen extending over the flanges 36 and into the channels 40. The edge of the screen is retained within the channel 40 by means of a compressible elongated member 46 which is preferably paper cord, rawhide, or the like. The compressible element 46 is pressed downwardly into the channel 40 along the length thereof with the edge of the screen between the inner faces of the channel and the member 46. When the member 46 is pressed into place within the channel 40 the converging sides of the channel will prevent its accidental displacement from the channel and thereby retain the screen in place.

A window 48 is pivotally mounted preferably along its top edge within the window openings 18 on the outside of the screen 44. The window 48 includes a transparent portion 50 mounted within a substantially channel shaped frame member 52 provided with wooden blocks extending along the base of the channel member 52. To reduce the shock on the transparent portion 50 and to provide an effective seal, a resilient felt member 56 is interposed between the edge portions of the transparent pane 50 which extends within the channel member 52 and the channel member.

In order to provide an effective seal for the window 48 a sealing strip 60, preferably of a resilient rubber material, is mounted within the channel 38 along its length having a portion extending beyond the opening of the channel. The rubber member 60 is securely held in place in the channel 38 by the converging sides of the channel.

Although the element 26 has been the only one described in detail, it is to be understood that the elements 24, 28 and 30 are substantially identical to the element 26; and it is evident that by forming the frame structure of these elements a simplified structure results and one in which a screen is securely held in place along all of its edges and window sealing element is securely held in place providing for sealing of the window when it is closed.

The inner edges of the window openings 18 may be given a finished appearance by covering the corners of the openings with metal members 62.

Formal changes may be made in the specific embodiment of the invention described without departing from the spirit and substance of the invention, the scope of which is commensurate with the appended claims.

What I claim is:

1. A window frame structure comprising elements connected together at their ends to form the frame outline, each of said elements being formed of a sheet metal member having an outwardly disposed flange along one edge, and an inwardly disposed flange along the other edge, said inwardly disposed flange being formed with adjacent and oppositely facing channels, said channels having a common wall.

2. A window frame structure comprising elements connected together at their ends to form the frame outline, each of said elements being formed of a sheet metal member having a longitudinally extending outwardly disposed flange along one edge thereof and a longitudinally extending inwardly disposed flange along the other edge thereof, said inwardly disposed flange having an inwardly facing channel adjacent its edge and an adjacent and outwardly facing channel remote from said edge.

3. A window frame element formed of a sheet metal member having a longitudinally extending outwardly disposed flange along one edge thereof, and a longitudinally extending inwardly disposed flange along the other edge thereof, said inwardly disposed flange being formed with adjacent and oppositely facing channels, the sides of said channels converging toward the openings thereof.

4. A window frame structure comprising elements connected together at their ends to form the frame outline, each of said elements being formed of a sheet metal member having a longitudinally extending outwardly disposed flange along one edge thereof, and a longitudinally extending inwardly disposed flange along the other edge thereof, said inwardly disposed flange being formed with adjacent and oppositely facing channels, the sides of said channels converging towards the openings thereof.

5. In combination, a window frame structure comprising elements connected together at their ends to form the frame outline, each of said elements being formed of a sheet metal member having a longitudinally extending outwardly disposed flange along one edge thereof, and a longitudinally extending inwardly disposed flange along the other edge thereof, said inwardly disposed flange being formed with adjacent and oppositely facing channels, a resilient sealing member secured in position in one of said channels, a screen member extending transversely of said frame outline having its edges disposed within the other of said channels, and means to secure said screen within said channels.

ORLEY J. CROWE.